United States Patent [19]

Carlson

[11] 4,345,467
[45] Aug. 24, 1982

[54] HIGH TEMPERATURE PRESSURE TRANSDUCER SYSTEM

[75] Inventor: Charles E. Carlson, Succasunna, N.J.

[73] Assignee: Allied Corporation, Morris Township, Morris County, N.J.

[21] Appl. No.: 187,121

[22] Filed: Sep. 15, 1980

[51] Int. Cl.³ .................. G01F 23/18; B22D 17/32
[52] U.S. Cl. ............................... 73/309; 164/155; 164/457; 222/595; 336/45
[58] Field of Search ................. 73/309, 453, 345

[56] References Cited

U.S. PATENT DOCUMENTS

| | | | |
|---|---|---|---|
| 2,282,538 | 5/1942 | Yarnall | 73/309 |
| 2,416,570 | 2/1947 | Coleman | 73/309 X |
| 2,647,395 | 8/1953 | Smith et al. | 73/453 |
| 2,649,771 | 8/1953 | Parks | 73/309 X |
| 3,234,792 | 2/1966 | Ririe et al. | 73/309 X |
| 3,269,184 | 8/1966 | O'Connor | 73/309 |
| 3,338,099 | 8/1967 | Remick, Jr. et al. | 73/345 |
| 3,754,446 | 8/1973 | O'Connor | 73/309 X |
| 3,768,542 | 10/1973 | Bosworth et al. | 164/421 X |
| 3,830,282 | 8/1974 | Schultz | 164/415 X |

FOREIGN PATENT DOCUMENTS 828600  1/1952  Fed. Rep. of Germany ........ 73/309

*Primary Examiner*—Daniel M. Yasica
*Attorney, Agent, or Firm*—Gerhard H. Fuchs; Ernest D. Buff

[57] ABSTRACT

A high temperature pressure transducer for measuring the total pressure adjacent the exit orifice of a crucible containing molten metal used in a continuous casting operation is disclosed. The pressure sensed includes a pressure head of the molten metal as well as the gas gauge pressure in the crucible above the metal. The transducer includes a sensor rod assembly having an immersible sensor rod fabricated of fused quartz and having a sensing surface, a sensor rod extension, an intermediate shaft, and a load cell connected to the intermediate shaft. A bellows provides a gas tight seal for the internal gas pressure in the crucible. The bellows is characterized by folds projecting inwardly and outwardly and providing equal volume in the two directions. By having a constant volume, it follows that the surface area of the folds in the two directions is the same so that any pressure changes along the bellows cancels out and does not adversely affect the reading at the load cell thereby assuring an accurate total pressure reading. In addition, a process is disclosed for controlling the flow rate of molten metal from the exit orifice of a closed crucible wherein the total gas and liquid pressure measurement obtained by the high temperature pressure transducer is used as an input into a control circuit which controls the amount of pressurized gas or vacuum applied to the crucible.

6 Claims, 3 Drawing Figures

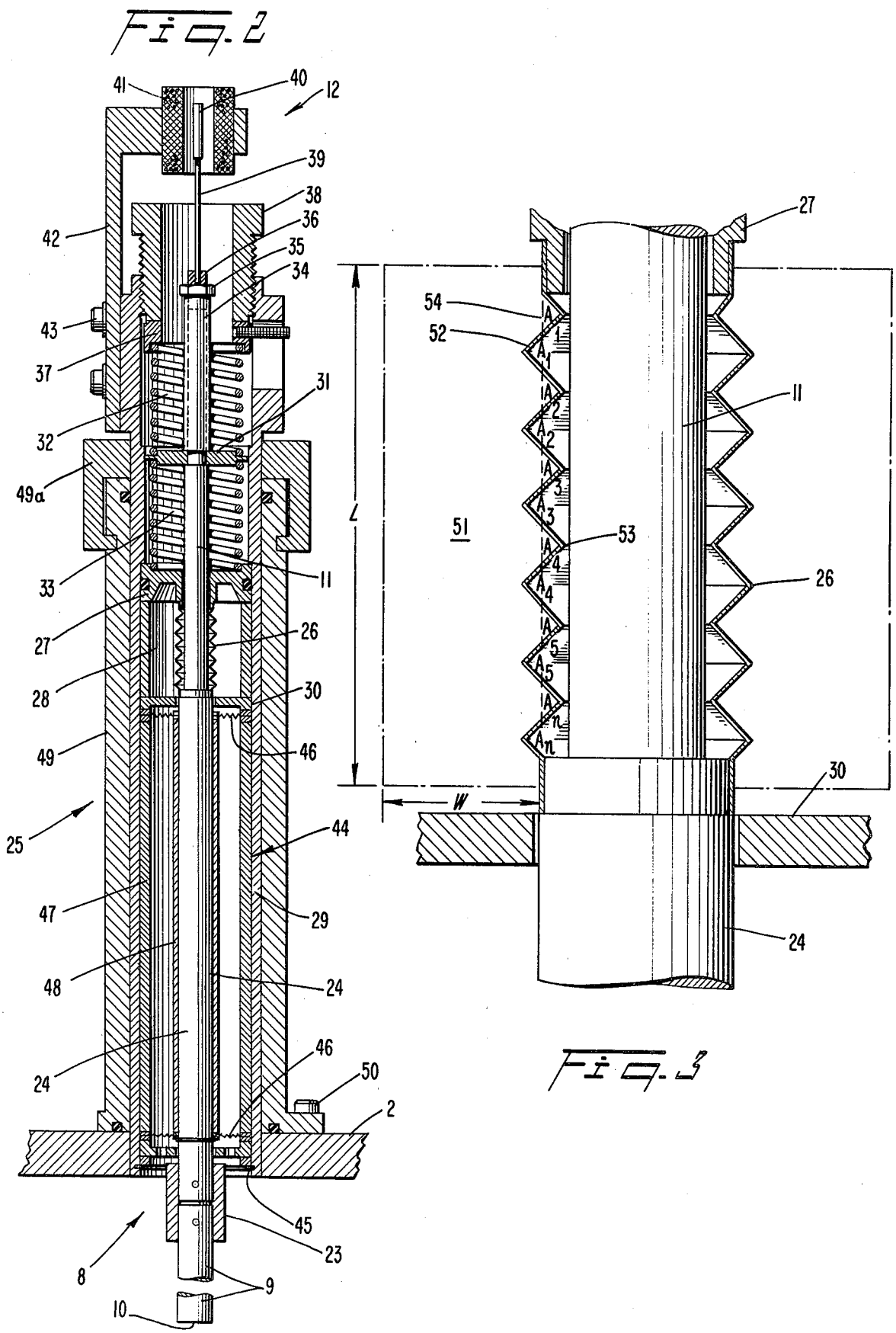

HIGH TEMPERATURE PRESSURE TRANSDUCER SYSTEM

TECHNICAL FIELD

The invention relates to devices for monitoring the internal conditions in crucibles containing molten metal to be used in metal casting operations.

BACKGROUND ART

In dispensing molten metal through an orifice in a crucible for casting, especially continuous casting in a mold, it is desirable to constantly monitor and regulate the pressure in the melt in the crucible near the exit orifice. Conventional pressure transducers are unsuitable because of the high temperature in the melt.

Currently used systems for monitoring the conditions within a closed crucible and controlling the flow rate from the crucible generally employ two sensors: one for measuring the gas pressure above the level of molten signal; and one for measuring the level of the molten metal. Such systems may also include a source of super-atmospheric pressure gas alone or in conjunction with a source of sub-atmospheric pressure gas (a vacuum); control circuitry which receives signals from the gas pressure sensor and the liquid level sensor; and valves controlled by the control circuitry for controlling the amounts of super-atmospheric pressure gas and sub-atmospheric pressure gas supplied to the crucible.

A representative example of a flow rate control system used with a bottom pour crucible is shown and described in U.S. Pat. No. 3,830,282 of Schultz. A representative example of a flow rate control system used with a top feed crucible is shown and described in U.S. Pat. No. 3,768,542 of Bosworth et al. Heretofore, insofar as I am aware, there has not been a successful system for monitoring the sum of both gas and liquid pressure in the crucible near the exit orifice to allow more efficient control of the molten metal flow.

It is, therefore, an object of the invention to provide a pressure transducer for monitoring the total pressure in the crucible, which can withstand the high temperatures of the molten metal, and which is capable of monitoring total presure at any desired location within the melt.

Another object of the invention is to provide a single pressure transducer which measures the sum of both the gas pressure and the pressure due to the molten metal in a crucible near the exit orifice.

Another object of the invention is to provide a processor for controlling the flow rate of molten metal from the exit orifice of a crucible by employing the steps of immersing a portion of a high temperature pressure transducer in the molten metal near the exit orifice of the crucible and measuring the total gas and liquid pressure exerted on a sensing surface of the immersed portion of the transducer.

It is an important principle in the art of precise measurement that the measuring instrument have structural characteristics which do not cause erroneous measurements. It is thus another object of the invention that the design of the pressure transducer be such that erroneous measurements are not caused by the transducer itself during operation.

DISCLOSURE OF INVENTION

A pressure transducer is provided for measuring the combined gas and hydrostatic pressure at a selected level in a liquid pool in a closed vessel; the transducer is especially suited for measuring such combined pressure adjacent the pouring orifice of a crucible having molten metal. The pressure transducer of the invention includes a sensor rod assembly including a sensor rod having a sensing surface immersed in the liquid pool. The sensor rod is axially displaceable responsive to changes in combined gas and hydrostatic pressure acting upon the sensing surface. Axial displacement of the sensor rod is sensed by sensing means. The sensor rod is made of material which can withstand the high temperatures of molten metal, for it is inserted directly into the melt within the crucible. For use with metal melting in the range of 1200°–1400° C., fused quartz generally is a suitable material.

The sensor rod senses the force in axial direction exerted by the combined gas and liquid pressure upwardly upon its bottom sensing surface. All other forces acting upon the sensor rod do not contribute to an axial force. Through a sensor rod extension and, optionally, an intermediate sensor shaft, the sensor rod acts on a sensing means for sensing axial displacement of the sensor rod. The action on or alteration of the sensing means thus serves as an indication of the gauge pressure in the crucible. The sensing means may be of any standard design, such as a strain gauge or a direct current displacement transducer (DCDT).

The pressure transducer of the invention may be used equally well near the exit orifice of a bottom pour crucible or a top feed crucible.

In a preferred pressure transducer of the invention, the sensor rod assembly includes a centering and support disk held between two springs retained in the transducer housing. By the use of an adjustment nut, the springs are either expanded or contracted thereby allowing biasing of the axial position of the sensor rod assembly, without substantially affecting its sensitivity.

An expansible seal, namely a bellows, is provided between the sensor rod assembly and the housing of the transducer to isolate the pressure in the crucible from the ambient pressure. The bellows is of critically specific construction, such that it is insensitive to pressure changes on either side, as well be explained in more detail below.

The bellows is sealingly connected at one end to the sensor rod assembly and at the other end to an annular sealing retainer positioned in the housing. The bellows is of a special design so that differences in gas pressures acting on the convolutions of the bellows do not provide any erroneous pressure readings as it expands and contracts. There are an equal number of critically sized and arranged inward and outward annular folds of the bellows in order to accomplish this result. The folds provide equal annular surface areas against which the pressures on both sides (inner and outer) act, thereby effectively canceling out all surface pressure forces.

A spacer sleeve surrounds the internal sensor rod extension. The spacer sleeve is centered by flexible diaphragms (flexures). The spacer sleeve moves axially with the sensor rod extension. The flexures, which are attached to the sensor rod extension, allow frictionless axial movement of the sensor rod and its extension while restraining radial movement.

By employing the novel pressure transducer of the invention, a novel process for controlling the flow of molten metal from a crucible is obtained. The novel process includes the following steps: immersing a portion of a high temperature pressure transducer in the molten metal of a crucible near the exit orifice; monitoring the total of gas presure exerted above the level of molten metal and the pressure exerted by the height of the liquid metal at a sensing surface on the immersed portion of the pressure transducer; and controlling the sum of the metallostatic and the gas pressure acting at the tip surface (sensing surface) of the sensing rod.

Still other objects and advantages of the present invention will become readily apparent to those skilled in this art from the following detailed description, wherein I have shown and described only the preferred embodiments of the invention, simply by way of illustration of the best modes contemplated by me of carrying out my invention. As will be realized, the invention is capable of other and different embodiments, and its several details are capable of modification in various, obvious respects, all without departing from the invention. Accordingly the drawings and description are to be regarded as illustrative in nature, and not as restrictive.

BRIEF DESCRIPTION OF DRAWINGS

FIG. 2 shows a detailed cross-sectional view of the preferred pressure transducer of the invention.

FIG. 3 shows an enlargement of the sealing bellows and surrounding bellows chamber that forms an important aspect of the present invention.

BEST MODE FOR CARRYING OUT THE INVENTION

Figure 1:
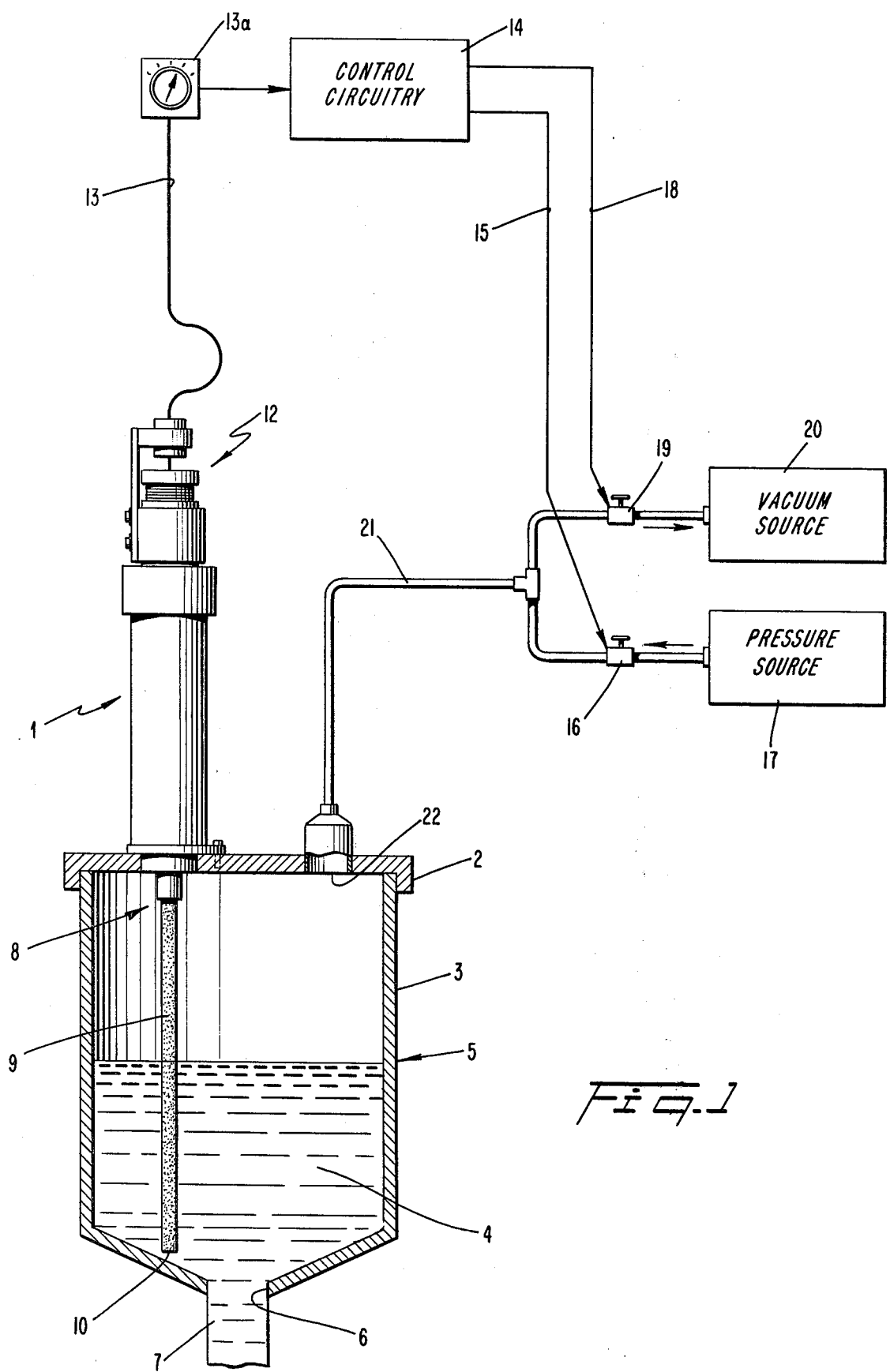
FIG. 1 shows a continuous casting system utilizing a pressure transducer and other features of the invention.

In FIG. 1, pressure transducer 1 is attached to crucible cap 2 covering crucible 3 containing a molten metal pool 4 at level 5. The crucible 3 has a bottom pour orifice 6 through which molten metal 7 is released. A continuous casting is formed below in a mold (not shown) in a conventional manner. Pressure transducer 1 includes a sensor rod assembly 8 (see also FIG. 2) having a lower sensor rod 9 with bottom sensing surface 10 directly sensing the combined effect of both gas and liquid pressure in the pool 4 at the level of the sensing surface. To do this, sensor rod 9 of the assembly 8 is directly immersed in molten metal pool 4.

The sensor rod assembly 8 includes intermediate sensor shaft 11, which in turn acts on displacement sensing means 12, here illustrated as a direct current displacement transducer. Line 13 connects displacement sensing means 12 to control circuitry 14. A meter 13a may be placed between displacement sensing means 12 and control circuitry 14. Control circuitry 14 is connected by line 15 to valve 16 that feeds super-atmospheric pressure from pressure source 17 to crucible 3, and by line 18 to valve 19 and vacuum source 20. Vacuum source 20 acts to extract gas from crucible 3. Super- or sub-atmospheric pressure sources 17 and 20, respectively, enter common pipe 21 connected to an opening 22 in crucible cap 2.

The gas pressure and the liquid head pressure of molten metal pool 4 contributed to the total pressure which drives the molten metal through the bottom pouring orifice 6 of the crucible 3. Pressure transducer 1 generates an electrical signal proportional to the total gas and liquid pressure at sensing surface 10 of sensor rod 9 adjacent the orifice 6. This signal is compared with a pre-set pressure stored in control circuitry 14. If a difference exists, control circuitry 14 opens the appropriate valve 16 or 19 until the desired total pressure adjacent the orifice 6 is obtained. If the measured pressure is too high, vacuum valve 19 is opened. If the pressure is too low, super-atmospheric pressure gas valve 16 is opened. In this manner, a constant pressure is maintained at the bottom of crucible 3. The feeding of the metal and formation of the continuous casting with constant density and size, is advantageously maintained.

With reference to FIG. 2, a detailed review of the major remaining structure of the pressure transducer 1 may be made. The sensor rod 9 inside the crucible 3 and having the sensing surface 10 is a solid rod (or a tube with a closed end) fabricated of a heat resistant material, preferably fused quartz. A sleeve coupler 23 connects the rod 9 with a sensor rod extension 24. A housing, generally designated by reference numeral 25, provides the support for the sensor rod assembly 8, as will be described more in detail below.

A bellows 26 is attached with a gas tight seal at one end to sensor rod extension 24 and at the other end to an annular sealing retainer 27. The bellows 26 thus serves to provide a seal for the gas contents of crucible 3 above the molten metal and advantageously isolates the inside of the crucible from ambient pressure. A bellows chamber 28 of essentially constant volume is defined by inner housing sleeve 29, the annular sealing retainer 27, lower annular ring 30, and the bellows 26. Inner housing sleeve 29, annular sealing retainer 27, and annular ring 30 may be regarded as elements of the housing 25 and thus define confining surfaces for bellows chamber 28. Bellows 26 is a movable inner defining surface for the bellows chamber 28. Desirably, sensor rod extension 24 and inner housing sleeve 29 are made of Invar TM, an alloy having low coefficient of thermal expansion, to minimize effects of temperature changes on length of the sensor rod extension.

A mechanism for supporting and allowing adjustment of the axial position of the sensor rod assembly includes a captive center disk 31 positioned between two springs 32 and 33. The disk 31 is retained in position by sleeve spacer 34 and nut 35. The nut 35 is in threaded engagement with threaded upper portion 36 of intermediate sensor shaft 11. Spring 32 is retained between slidable retainer ring 37 and disk 31. Spring 33 is retained in position by disk 31 and annular sealing retainer 27 which is fitted in sleeve 29 by means of O-ring 27a. The two opposed springs 32, 33 thus directly support intermediate shaft 11 and indirectly the entire sensor rod assembly 8. An adjustment nut 38 threadedly engages the inner housing sleeve 29 of housing 25. As adjustment nut 38 is turned, retainer ring 37 is moved thereby compressing or relaxing springs 32 and 33. As springs 32 and 33 are compressed or relaxed, disk 31 and intermediate sensor shaft 11 are moved down or up respectively. Thereby, the axial position of the sensor rod assembly 8 is adjusted allowing an initialization of the pressure transducer 1 at a selected set point. The adjusting nut 38 thus merely positions the bellows 26 and flexures 46 in a neutral, undeflected state. The choice of stiffness of springs 31 and 32 determines the sensitivity of the pressure transducer; softer springs result in greater sensitivity and, conversely, stiffer springs result in lessened sensitivity.

In operation in accordance with the invention, after initial adjustment by means of adjusting nut 38, sensor rod assembly 8 responds to changes in the total sum of the pressures of: (1) the gas pressure above the molten metaal; and (2) the liquid head pressure provided by the height of liquid metal above sensing surface 10. The response is in the form of movement of the rod assembly 8 thereby resulting in compression or expansion of springs 32 and 33. The movement of rod assembly 8 is very slight, and within the range set, the compression coefficient of the springs is linear. As a consequence, displacement sensing means input rod 39 attached to intermediate shaft 11 moves a proportional amount to any change in the total pressure. In turn, the displacement sensing means 12 provides an electrical output signal directly proportional to the pressure change. Then as described, correction to the total pressure in the bottom of the crucible is made by controlling the appropriate valve 16 or 19 through the circuitry 14.

Displacement sensing means 12 is a direct current displacement transducer (DCDT) and includes core 40 on the input rod 39 and winding 41. Bracket 42 is attached to inner housing sleeve 29 by bolts 43 to support the sensing means 12. As core 40 moves within the confines of winding 41, the current through winding 41 is altered providing the output signal described. While here illustrated as a direct current displacement transducer, any of the well-known frictionless displacement transducers, whether operating on electrical, magnetic, acoustic, optical or mechanical principals, could serve as displacement sensing means.

A spacer, shown generally at 44, is placed within inner housing sleeve 29 and is retained at the bottom by retaining ring 45. Annular flexible diaphragms or flexures 46, within spacer 44, extend inwardly from tubular spacer 47 to support spacer sleeve 48. The flexures 46 serve to substantially prevent radial movement of, but allow substantially free unrestrained axial movement of sensor rod assembly 8, and its associated spacer sleeve 48.

The housing 25 includes means for attaching and supporting the pressure transducer 1 to crucible cap 2. In the embodiment shown, an outer mounting sleeve 49 and split clamp 49a holds inner housing sleeve 29 for this purpose. Split clamp 49a serves to hold the whole sensor rod assembly 8 in any desired position, extended or retracted, to permit sensing at any desired level within the crucible. Sleeve 49 is connected to crucible cap 2 by means of a flange and bolts 50.

Initially, the sensor rod assembly 8 must be raised when a solid ingot is placed in the crucible 3 for melting.

Though the description of the pressure transducer 1 of the invention has been of an embodiment whose sensor rod assembly 8 is installed vertically through crucible cap 2, the broadest principles of the invention allow the sensor rod 9 to be installed horizontally or at any other angle in crucible 3.

It should be noted that the combined use of the flexures and the bellows allows essentially frictionless axial movement of the sensing rod and associated parts. Radial movement is restrained. The elimination of friction is an important aspect to the functioning of the transducer.

During use of the pressure transducer in a continuous casting process, it is desired to measure changes in orifice pressure of the order of 0.03 psi, which corresponds to a change in level of the molten alloy of about 0.1 inch. A sensor rod 9 of suitable size is 0.5 inches in diameter having 0.1963 square inches in area on sensing surface 10. A change of 0.03 psi acting upon sensing surface 10 thereby develops a sensed force of 0.00588 pounds of force (0.03 psi×0.1963 in$^2$=0.00588 pounds) which is a force measurable using available load cells.

In FIG. 3 an enlargement of a cross-section of bellows chamber 28 (see FIG. 2) is shown. To explain the particular advantages of the specially designed bellows 26, acting as a seal between the inside of crucible 3 and the atmosphere, volume 51 of dimensions L×W is of particular interest. Upon expansion and contraction of bellows 26, and consequently the entire annular chamber 28, the volume 51 remains constant. Thus, there are no outside forces acting on the bellows 26 to create a false reading, as will now more fully be explained.

With respect to the area 51 (and thus the volume of chamber 28), bellows 26 has inward annular folds 52 and outward annular folds 53 separated by symmetry line 54. The cross-sectional area of each inwardly projecting triangle formed by each annular fold 52 and line 54 is equal to $A_1 \ldots A_n$. All A's are equal. Symmetry line 54 corresponds to the outer diameter of sensor rod 24. The cross-sectional area of each outwardly projecting triangle formed by each annular fold 53 and line 54 is also equal to A, namely, $A_1 \ldots A_n$. The volume of the portion of the bellows chamber 28 of interest, as may be represented by area 51, is $L \times W + A_1 - A_1 \ldots + A_n - A_n$ in any expanded or contracted position of the bellows 26, which reduces to $L \times W$.

To consider the structure of the bellows 26 in another way, the net contribution of the folds or convolutions of the bellows 26 to the bellows chamber 28 is zero. Thus, as sensor rod assembly 8 moves vertically upward or downward, areas $A_1 \ldots A_n$ become smaller or larger, respectively; however, the net contribution of the volume of the bellows 26 to the bellows chamber 28 still is zero. With this in mind, it can be seen that the changes in gas pressure on either side of the bellows does not act to cause the bellows 26 to extend or contract. The bellows 26 is in effect insensitive to pressure changes on both sides thereof. Thus, the only changing force acting on the sensor rod assembly 8 after initialization and during operation is due to the total pressure in the crucible 3 adjacent the orifice 6, as desired. The bellows 26 effectively isolates the crucible interior from ambient pressure and does not adversely affect the output reading.

In view of the foregoing, it can be seen that a pressure transducer 1 is provided for effectively measuring total pressure of molten metal in a crucible. The transducer 1 advantageously measures the sum of both the gas gauge pressure and the pressure from the head of molten metal in the crucible near the exit orifice 6. By virtue of a specially designed bellows 26, erroneous measurements which would otherwise result from the pressures acting on the folds of the bellows are prevented.

In addition, a novel process for controlling the flow of molten metal from the exit orifice of a crucible used in a continuous casting operation has been disclosed. The process includes immersing a portion of high temperature pressure transducer in the molten metal of a crucible near the exit orifice; monitoring the total of gas pressure exerted above the level of molten metal and the pressure exerted by the liquid metal head at a sensing surface on the immersed portion of the pressure transducer; and controlling the total pressure in the crucible using the total pressure measurement obtained by the pressure transducer.

The apparatus herein described is a true pressure transducer, and as such responds only to the pressure acting on the bottom of the sensing rod. Once the transducer has been calibrated, it will correctly indicate the pressure (combined gas pressure and hydrostatic components) on the bottom of the sensing rod, for any gas and any liquid. Thus, its use is not limited to sensing pressures predetermined levels within closed crucibles, as above described. It could be useful in other applications, e.g. in corrosive liquids where corrosion resistant materials could not be formed into diaphragms of the type used in conventional pressure transducers.

In this disclosure, there is shown and described only the preferred embodiments of the invention, but as aforementioned, it is to be understood that the invention is capable of use in various other combinations and environments and is capable of changes or modifications within the scope of the inventive concept as expressed herein.

We claim:

1. A pressure transducer for measuring the combined gas and hydrostatic pressure at a selected level in a liquid pool in a closed vessel, comprising:
    sensor rod means extending into the pool through a top wall portion of the vessel and having a submerged sensing surface which senses the total combined pressure acting on said sensing surface resulting from hydrostatic pressure of said liquid pool and gas pressure exerted on the pool;
    housing means sealingly supporting said sensor rod means, said housing means including resilient means for restraining radial movement of said sensor rod means but permitting axial movement responsive to changes in sensed pressure;
    spring means associated with said housing means and acting upon said sensor rod means, biasing it against axial displacement;
    sensing means in cooperation with said sensor rod means for sensing and signaling axial displacement of said sensor rod means; and
    sealing means having an end surroundingly attached to said sensor rod means and the other end connected to said housing means to isolate the interior of said vessel from ambient atmosphere, said sealing means being insensitive to gas pressure acting upon it directly from either side.

2. The pressure transducer as described in claim 1 wherein said sealing means comprises a bellows having inwardly projecting annular folds defining an inwardly projecting volume and having outwardly projecting annular folds defining an outwardly projecting volume, the inwardly projecting volume and the outwardly projecting volume being essentially equal over the full extent of movement of the bellows.

3. A pressure transducer as described in claim 1 wherein said sensor rod means includes an infusible rod, an extension for said sensor rod means, and means for coupling said sensor rod means to said sensor rod means extension.

4. A pressure transducer as described in claim 1 further including a guide means attached to said housing means and engaging said sensor rod means, said guide means including flexure means to impede the radial movement of, but allow axial movement of, said sensor rod means.

5. A pressure transducer as described in claim 1 wherein said sensor rod means includes a fused quartz portion to allow immersion in high temperature liquid.

6. A pressure transducer as described in claim 3 further including:
    an intermediate shaft connected between said sensor rod means extension and said sensing means;
    a centering disk connected to said intermediate shaft;
    spring means positioned on opposite sides of said centering disk; and
    adjustment means connected to said housing and in contact with said spring means, said adjustment means compressing said spring means, whereby the sensor rod means may be positioned at a desired level, balanced in neutral position.

* * * * *